US010462067B2

(12) United States Patent
Emmett et al.

(10) Patent No.: US 10,462,067 B2
(45) Date of Patent: Oct. 29, 2019

(54) PROACTIVE CHANNEL AGENT

(71) Applicant: INTERNATIONAL BUSINESS MACHINES CORPORATION, Armonk, NY (US)

(72) Inventors: Andrew A. Emmett, Eastleigh (GB); Si Bin Fan, Beijing (CN); Hui Li, Beijing (CN); Hao Lian, Beijing (CN); Jing Quan, Beijing (CN); Shan Yu, Beijing (CN); Juan Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 315 days.

(21) Appl. No.: 15/416,074

(22) Filed: Jan. 26, 2017

(65) Prior Publication Data
US 2018/0212857 A1    Jul. 26, 2018

(51) Int. Cl.
*H04L 12/911* (2013.01)
*G06F 9/50* (2006.01)
*H04L 12/861* (2013.01)

(52) U.S. Cl.
CPC .......... *H04L 47/743* (2013.01); *G06F 9/50* (2013.01); *H04L 49/9057* (2013.01)

(58) Field of Classification Search
None
See application file for complete search history.

(56) References Cited

U.S. PATENT DOCUMENTS

| | | | |
|---|---|---|---|
| 6,817,018 B1 * | 11/2004 | Clarke | G06F 9/466 714/E11.13 |
| 7,734,785 B2 | 6/2010 | Zu Bexten | |
| 8,112,760 B2 | 2/2012 | Garza | |
| 8,745,635 B2 | 6/2014 | Balko | |
| 9,110,745 B2 | 8/2015 | Kang | |
| 9,350,565 B1 * | 5/2016 | Vosshall | H04L 12/54 |
| 2003/0041285 A1 * | 2/2003 | Chen | G06F 11/073 714/16 |

(Continued)

OTHER PUBLICATIONS

Peter Mell et al, The NIST Definition of Cloud Computing, National Institute of Standards and Technology, Publication 800-145, 2011.

(Continued)

*Primary Examiner* — Joshua Joo
(74) *Attorney, Agent, or Firm* — Patrick J. Daugherty; Daugherty & Del Zoppo Co., LPA

(57) ABSTRACT

Automated devices send messages of a first batch sequence individually to a target queue of a receiving node of a cluster of server nodes, the messages having a different sequence number indicative of their relative positions within the batch sequence, and each is associated with a first logic unit of work identifier. In response to determining that a message counter meets a threshold, a force commit packet is generated to include the sequence number of the last batch message sent to the target queue. If the force commit packet sequence number is not the last position number within the batch sequence, a second logic unit of work identifier is associated with a subset sequence of the batch of messages having sequence numbers spanning from the first number to the force commit packet sequence number, and the subset sequence messages are committed to the receiving node target queue.

20 Claims, 5 Drawing Sheets

(56) References Cited

U.S. PATENT DOCUMENTS

2007/0260644 A1\* 11/2007 Ljungqvist .......... G06F 16/2379
2012/0174109 A1\* 7/2012 Dolby ................. G06F 11/1474
718/101
2015/0222556 A1 8/2015 Chan et al.

OTHER PUBLICATIONS

Jatinder Singh et al, Integrating Messaging Middleware and Information Flow Control, IEEE International Conference on Cloud Engineering, Computer Society, 2015.

\* cited by examiner

PROACTIVE CHANNEL AGENT

BACKGROUND

A computer cluster consists of a set of computer servers (cluster nodes) that are connected to each other through fast local area networks ("LAN") and work together so that, in many respects, they can be viewed as a single system. Each node generally runs its own instance of an operating system, and they may use similar or dissimilar hardware and operating systems. Computer clusters are generally deployed to improve performance and availability relative to the capabilities of a single computer, and may be much more cost-effective than single computers of comparable speed or availability.

A processor configured by executing appropriate program code instructions may function as a message channel agent that controls the sending and receiving of messages between message engines of respective nodes on a channel defined in a messaging computer cluster environment. Message channel agents move messages from one queue manager to another, wherein there is generally one message channel agent at each end of a channel. A channel is started on a channel initiator if it has access to a channel definition for a channel with that name. A channel definition can be defined to be private to a queue manager, or stored on the shared repository and available anywhere (a group definition). This means that a group defined channel is available on any channel initiator in a queue-sharing group.

Messaging cluster environment structures are commonly used in enterprise production environments, wherein a given application consumes messages from a same cluster queue instance defined on multiple messaging engines of the cluster nodes. Agile environments enable development of new versions of messaging applications in a short time cycles, and new versions may be deployed before they are fully tested, leading to production stability concerns.

BRIEF SUMMARY

In one aspect of the present invention, a computerized method for a proactive channel agent structure includes executing steps on a computer processor. Thus, a computer processor sends individually to a target queue of a receiving node of a cluster of server nodes messages of a first batch sequence of messages, each with different sequence numbers indicative of their relative positions within the batch sequence, and wherein each of the batch sequence messages is associated with a first logic unit of work identifier. The processor updates a message counter value in response to each receipt by the receiving node of one of the batch sequence messages sent to the target queue. In response to determining that the updated message counter value meets a threshold limit, the processor generates a force commit packet that includes the sequence number of the last of the batch messages sent to the target queue. In response to determining that the sequence number of the generated force commit packet data is not a last position number within the first batch sequence, the processor associates a second logic unit of work identifier with a subset sequence of the batch of messages that includes a messages having different sequence numbers spanning from a first number to the sequence number of the generated force commit packet data, and commits the subset sequence plurality of messages to the target queue of the receiving node.

In another aspect, a system has a hardware processor in circuit communication with a computer readable memory and a computer-readable storage medium having program instructions stored thereon. The processor executes the program instructions stored on the computer-readable storage medium via the computer readable memory and thereby sends individually to a target queue of a receiving node of a cluster of server nodes messages of a first batch sequence of messages, each with different sequence numbers indicative of their relative positions within the batch sequence, and wherein each of the batch sequence messages is associated with a first logic unit of work identifier. The processor updates a message counter value in response to each receipt by the receiving node of one of the batch sequence messages sent to the target queue. In response to determining that the updated message counter value meets a threshold limit, the processor generates a force commit packet that includes the sequence number of the last of the batch messages sent to the target queue. In response to determining that the sequence number of the generated force commit packet data is not a last position number within the first batch sequence, the processor associates a second logic unit of work identifier with a subset sequence of the batch of messages that includes a messages having different sequence numbers spanning from a first number to the sequence number of the generated force commit packet data, and commits the subset sequence plurality of messages to the target queue of the receiving node.

In another aspect, a computer program product for a proactive channel agent structure has a computer-readable storage medium with computer readable program code embodied therewith. The computer readable hardware medium is not a transitory signal per se. The computer readable program code includes instructions for execution which cause the processor to send individually to a target queue of a receiving node of a cluster of server nodes messages of a first batch sequence of messages, each with different sequence numbers indicative of their relative positions within the batch sequence, and wherein each of the batch sequence messages is associated with a first logic unit of work identifier. The processor is caused to update a message counter value in response to each receipt by the receiving node of one of the batch sequence messages sent to the target queue. In response to determining that the updated message counter value meets a threshold limit, the processor is caused to generate a force commit packet that includes the sequence number of the last of the batch messages sent to the target queue. In response to determining that the sequence number of the generated force commit packet data is not a last position number within the first batch sequence, the processor is caused to associate a second logic unit of work identifier with a subset sequence of the batch of messages that includes messages having different sequence numbers spanning from a first number to the sequence number of the generated force commit packet data, and commit the subset sequence plurality of messages to the target queue of the receiving node.

BRIEF DESCRIPTION OF THE DRAWINGS

These and other features of embodiments of the present invention will be more readily understood from the following detailed description of the various aspects of the invention taken in conjunction with the accompanying drawings in which.

DETAILED DESCRIPTION

Figure 1:
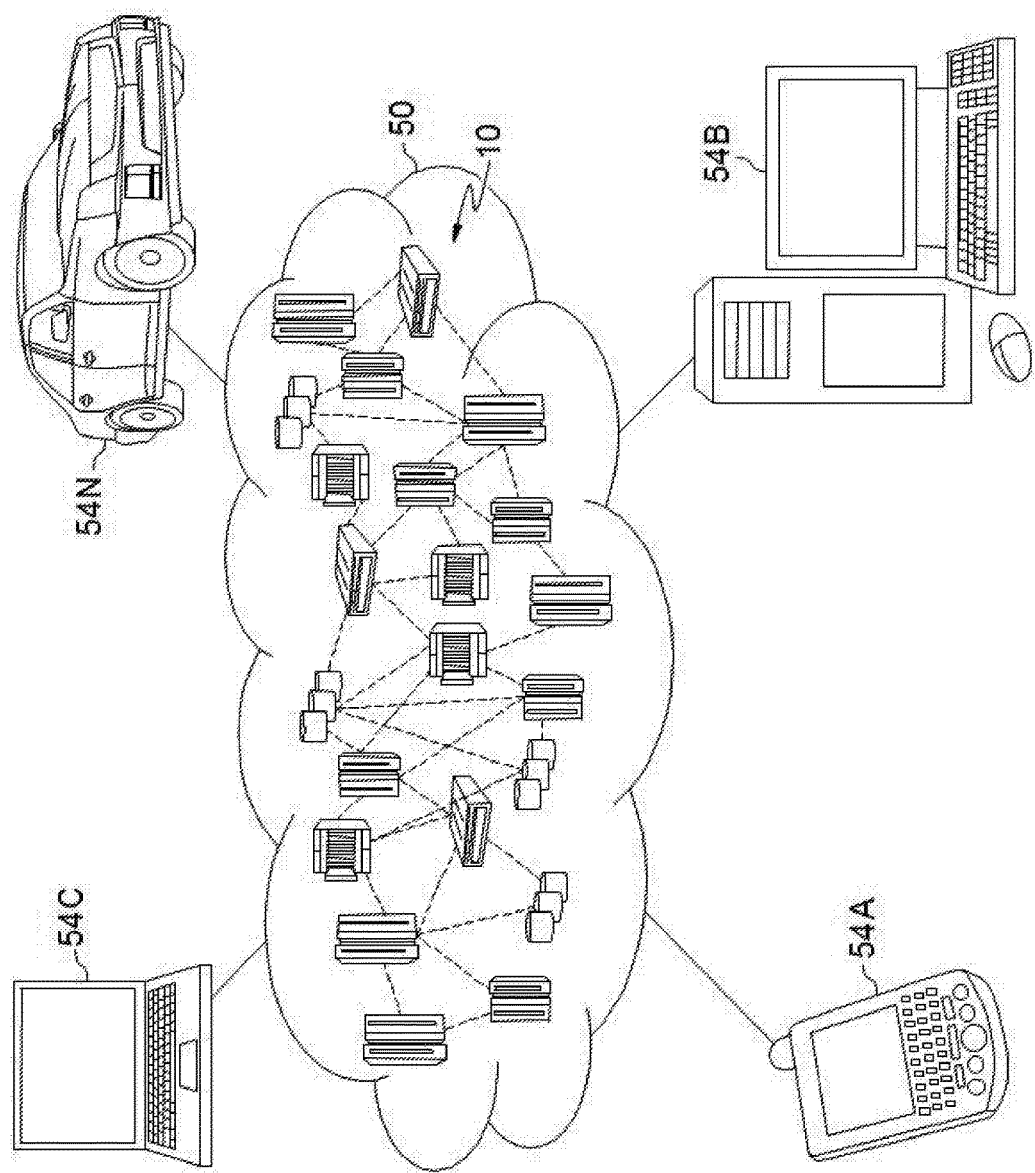
FIG. 1 depicts a cloud computing environment according to an embodiment of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
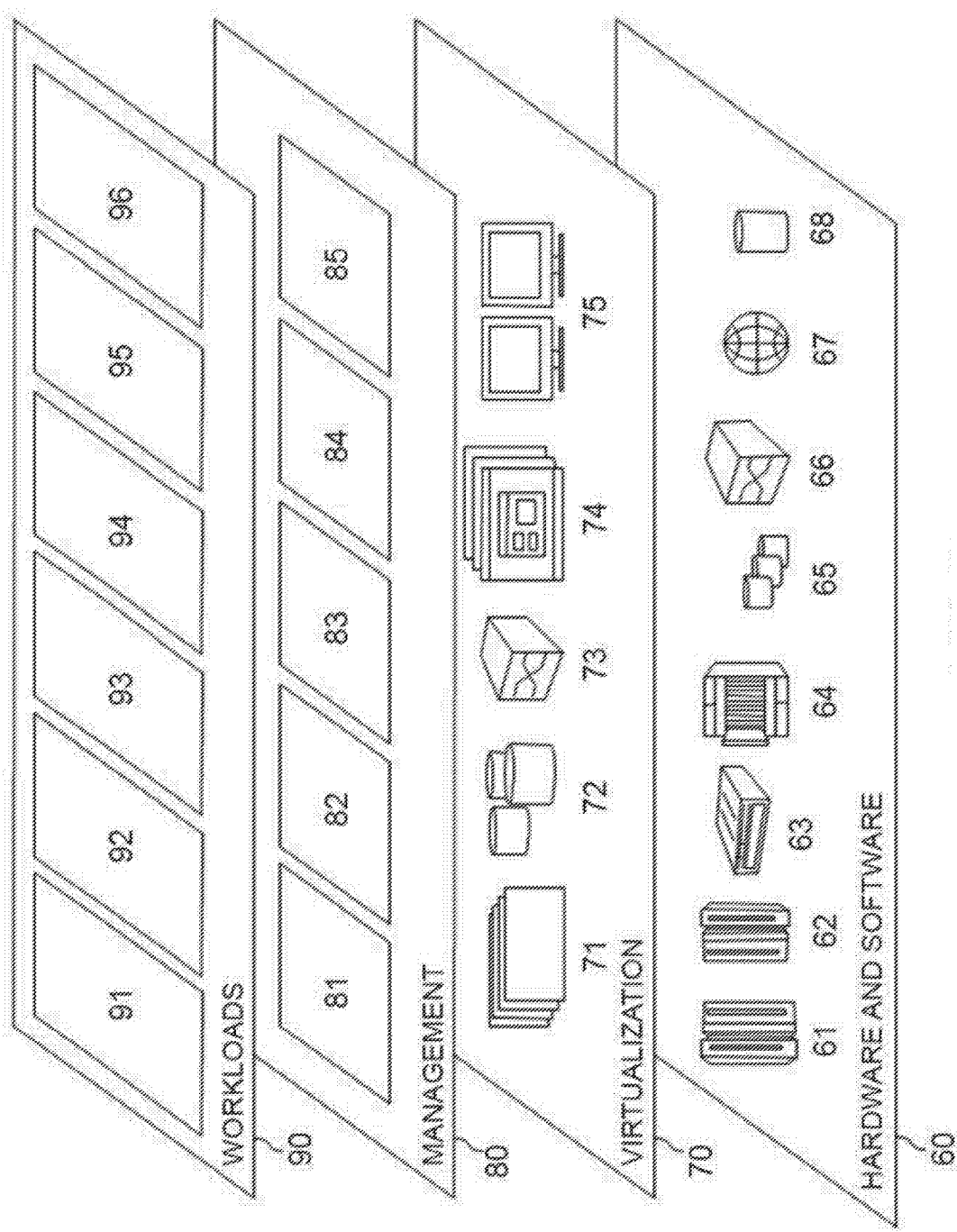
FIG. 2 depicts a cloud computing node according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Figure 4:
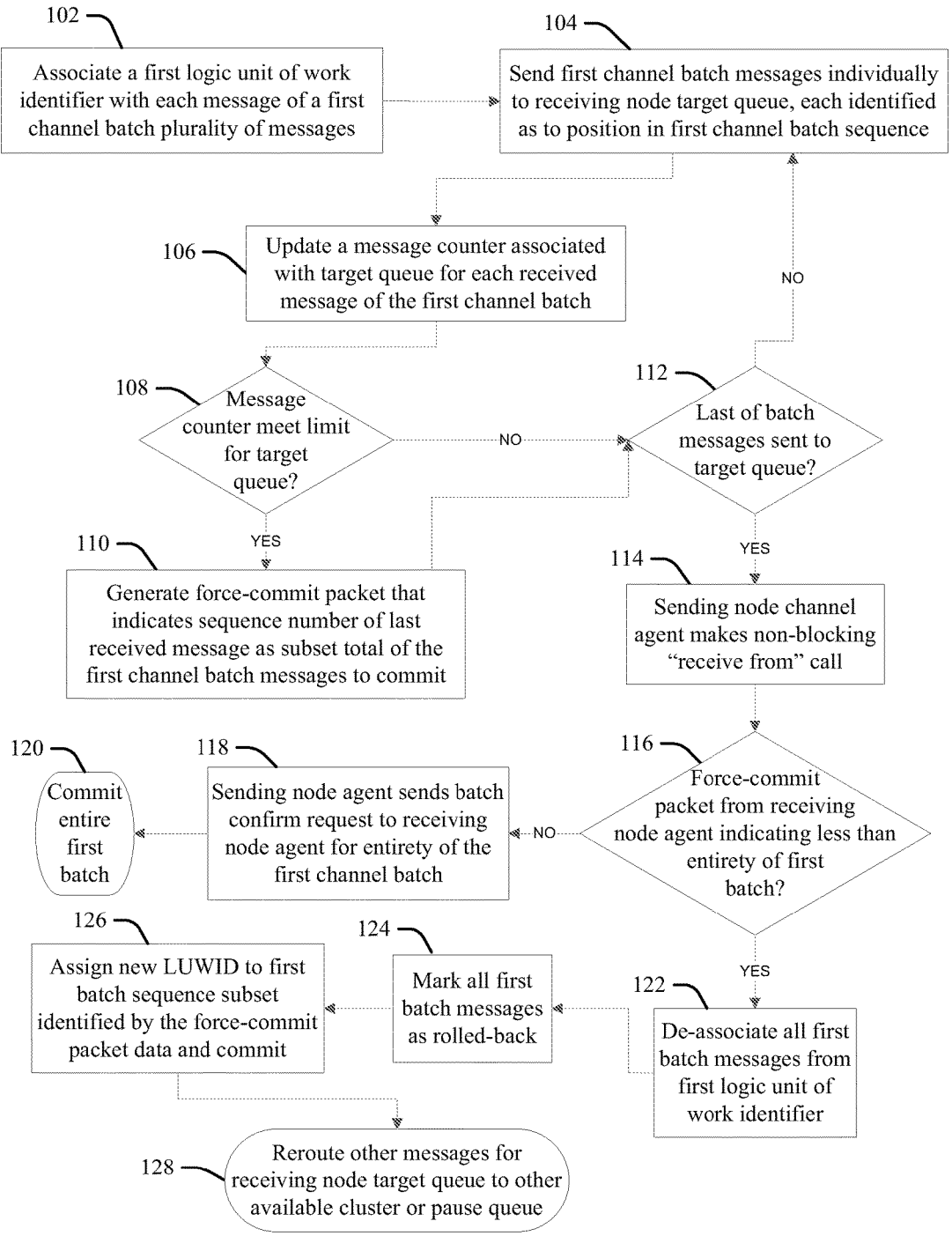
FIG. 4 is a flow chart illustration of a process or system according to an embodiment of the present invention.
Figure 5:
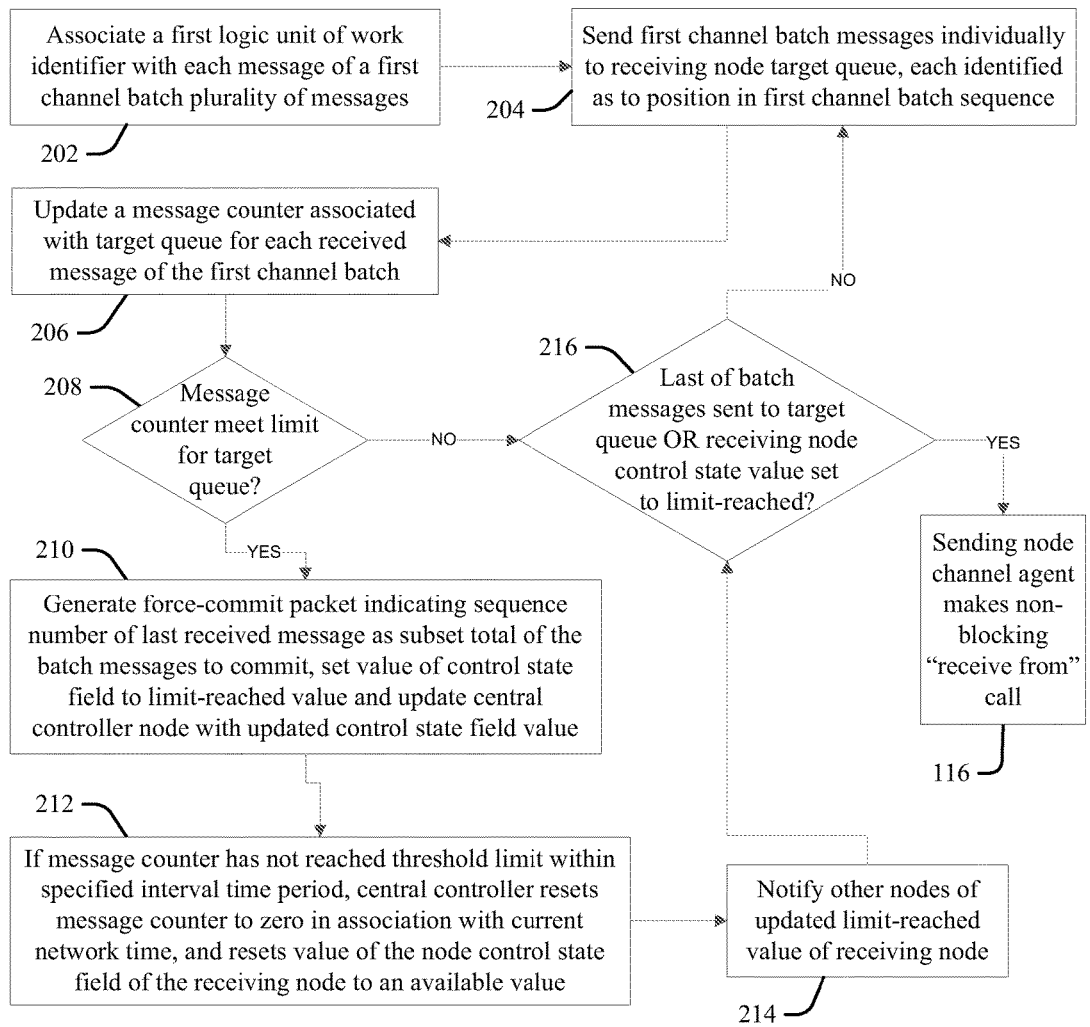
FIG. 5 is a flow chart illustration of a process or system according to another embodiment of the present invention.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing 96 according to embodiments of the present invention, for example to execute the process steps or system components or tasks as depicted in FIG. 4 or FIG. 5 below.

Figure 3:
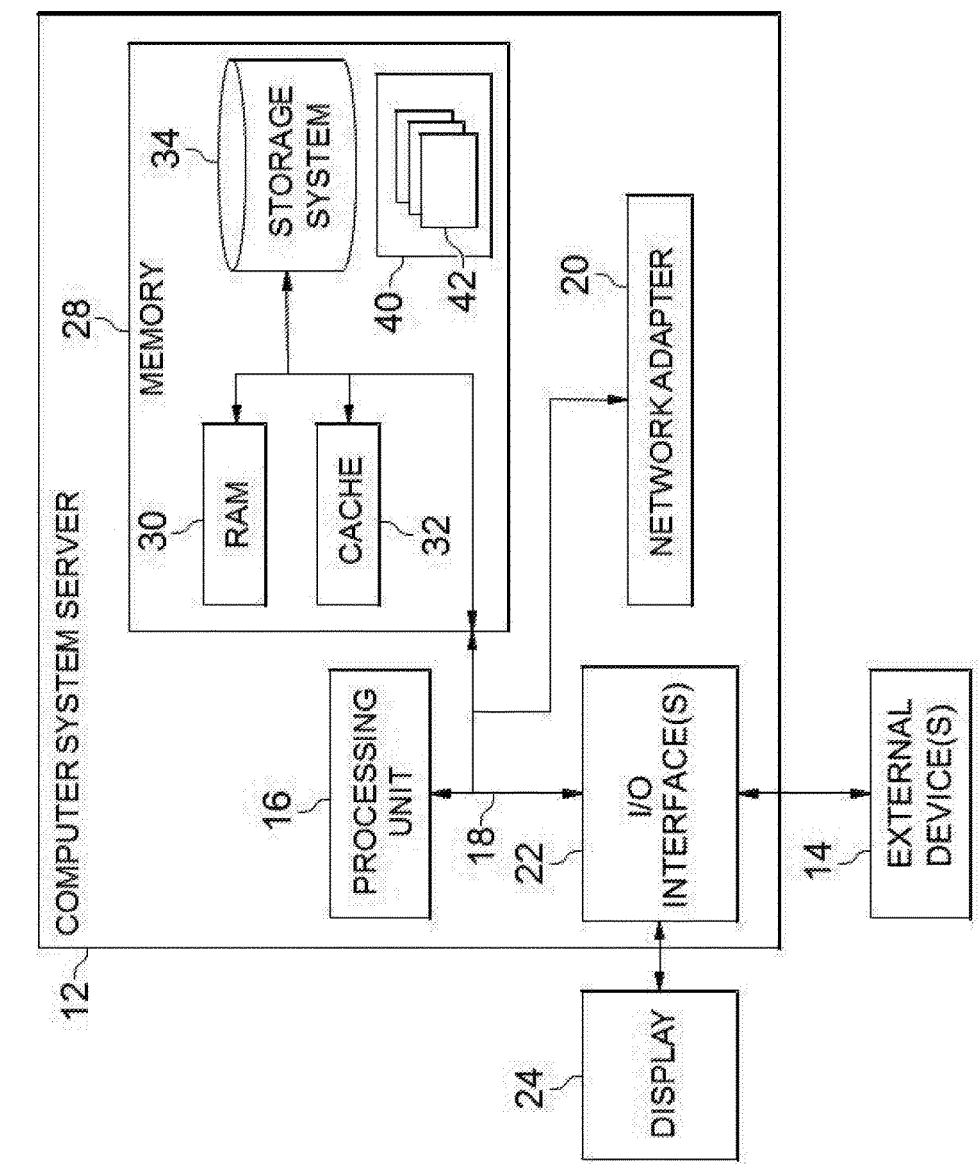
FIG. 3 depicts a computerized aspect according to an embodiment of the present invention.

FIG. 3 is a schematic of an example of a programmable device implementation 10 according to an aspect of the present invention, which may function as a cloud computing node within the cloud computing environment of FIG. 2. Programmable device implementation 10 is only one example of a suitable implementation and is not intended to suggest any limitation as to the scope of use or functionality of embodiments of the invention described herein. Regardless, programmable device implementation 10 is capable of being implemented and/or performing any of the functionality set forth hereinabove.

A computer system/server 12 is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

FIG. 4 illustrates a process or system for a proactive channel agent structure according to the present invention. A server processor configured by executing program code instructions according to the present invention (the "configured processor) functions as proactive channel agent of a first, sending node within a messaging computer cluster plurality of nodes. At 102 the sending node proactive channel agent associates a first Logic Unit of Work Identifier (for example, "LUWID1") to each message of a plurality of a first channel batch of messages (the LUWID1 channel batch) destined for sending over a message channel to a target queue (for example, a "TargetQueue" field) of another, different (second) receiving node of the cluster.

The first channel batch is a logical unit of work defined for reliable message transfer confirmation, wherein a given message within the first batch is not visible for a consumer application to get until the entire batch is committed. The channel used is defined within an environment of the cluster for sending messages from other cluster nodes to the target queue field of the second node. The batch size (number of messages) is defined for the cluster environment: in one example fifty (50) messages, though other batch sizes may be practiced according to the present invention.

At 104 the proactive channel agent of the sending node sends messages of the first channel batch on a sequential, individual basis (one at a time) to the target queue of the second, receiving node, wherein each is identified with respect to its position in the channel batch sequence with a unique sequence number. For example, the value of a "SeqInBatch" field may be chosen from the set of one through fifty for a batch of fifty messages.

At 106 a server processor configured to function as a proactive channel agent according to the present invention for the receiving node indexes or otherwise updates a message counter (for example, a "MsgCounter" field) associated with a node control structure field (for example, a "NodeControlStruct" field) of the target queue each time it receives a single message of the first channel batch directed to the target queue.

In response to determining at 108 that the value of the message counter meets a threshold limit defined for the target queue (for example, a "MsgNumLimit" field), at 110 the receiving node channel agent generates and sends a "force-commit" packet back to the sending node proactive channel agent that indicates the sequence number of the channel batch message last sent to the target queue as a subset of the first channel batch it wants to commit. For example, a "SeqInBatch=40" is sent back in the force-commit packet if the fortieth of the sequence of channel batch messages sent to the target queue resulted in "MsgCounter=MsgNumLimit." In one example the MsgNumLimit value is one thousand (1,000), though other values may be practiced.

In response to determining at 112 that the last of the first channel batch messages has been sequentially sent to the target queue of the second node (for example, SeqInBatch=50), at 114 the sending node proactive channel agent makes a non-blocking "receive from" call ("recv( )") to read any buffered "force-commit" packet data sent by the receiving node proactive channel agent, which would include one generated or sent at 110.

In response to determining at 116 that no buffered force commit package is found from the receiving node agent, or that the sequence number of a found buffered force commit package is the last of an entirety of the first batch messages, at 118 the sending node proactive channel agent sends a batch confirm request to the receiving node agent for the entire first channel batch, in order to commit the entire batch in response to a confirmation reply from the receiving channel agent at 120.

Otherwise, in response to determining at 116 that a found buffered force commit package comprises a sequence number of the last received message that is not the last sequence number of the first batch of messages (thus, that less than an entirety of the first batch messages was sent), at 122 the sending node proactive channel agent de-associates all of the (in this example, fifty) first channel batch messages from the first logic unit of work identifier (in this example, "LUWID1"), marks them as rolled back at 124, and at 126 assigns a new LUWID (for example, "LUWID2") to the sequence subset identified in the force-commit packet data (in this example, the first 40 messages of the original first channel batch) and commits said subset with the new LUWID to the target queue of the receiving node.

At 128 the sending node proactive channel agent continues sending other messages for the target queue of the second, receiving node (including the last ten messages of said first channel batch that were not committed at 122) by either rerouting them to other message engines of other nodes that are available within the cluster (their node control state field values are not set to the limit-reached value), or by putting them in a pause queue (for example, to a "PauseQueue" field) or other buffer structure if no other node message engines are available for re-routing.

FIG. 5 illustrates another, different embodiment according to the present invention that incorporates node controllers within cluster nodes that are in communication with a central controller server. At 202 a server processor configured by executing program code instructions (the "configured processor") provides a proactive channel agent of a sending, first node within a messaging computer cluster plurality of nodes that associates a unique logic unit of work identifier with each message of a plurality of a first channel batch of messages destined for sending over a message channel to a target queue of another, receiving node of the cluster.

At 204 the sending node proactive channel agent sends messages of the first channel batch on a sequential, individual basis (one at a time) to the target queue of the second, receiving node, each is identified with a unique sequence number.

At 206 a server processor of the other receiving node functions as a proactive channel agent and updates a message counter for the target queue each time it receives a single message of the first channel batch directed to the target queue.

In response to determining at 208 that the value of the message counter meets a threshold limit defined for the target queue, at 210 the receiving node proactive channel agent sends a "force-commit" packet back to the sending node proactive channel agent that indicates the sequence number of the channel batch message last sent to the target queue that it wants to commit; sets the value of a node control state field of the receiving node to a limit-reached value that indicates that the commit threshold has been reached for the node (for example, "NodeControlState={ (TargetQueue, REACH_LIMIT)}"), and sends the limit-reached value to a central controller node of the cluster environment (another server having a processor configured by executing program code instructions according to the present invention to server as a central controller node) to update the central controller of the receiving status of the target queue of the second, receiving node.

At 212 the central controller determines whether the message counter reached the threshold limit within a specified interval time period. For example, determining whether a time value associated with the message receipt triggering the threshold limit value falls within a specified interval time period defined from a starting time (value within a "TimeS" field) to an ending time equal to the TimeS value plus an ending "TimeE" field value. If not, then the time interval has elapsed and the central controller resets the message counter to zero in association with a new TimeS value set to the current network time, resets the value of the node control state field of the receiving node from the limit-reached value to an available value (for example, "{(TargetQueue, AVAILABLE)}").

At 214 the central controller informs (updates) all of the other nodes of the current (updated) limit-reached value of the node control state field of the receiving node, wherein the other nodes may responsively halt transmissions of messages to the target queue of the receiving second node in response to a setting of the value of the node control state field of the receiving node to the limit-reached value.

Thus, at 216, in response to determining that the last of the first channel batch messages has been sequentially sent to the target queue of the second node, or that the value of the node control state field of the receiving node is set (updated) to the limit-reached value, the current example moves on to step 116 of the process illustrated in FIG. 4 and discussed above.

It is known in the prior art for an application to send batches of messages grouped by logic unit of work identifier (LUWID) affinities to a queue manager. The prior art queue manager may fail to receive messages after receiving only part of the batch, wherein a sending queue manager must wait for it to recover and process the incomplete message batch before it can send any more messages. A batch of messages with such affinities can lock resources at the destination queue manager while waiting for subsequent messages. These resources might remain locked for long periods of time, preventing other applications from doing their work.

By providing for automated mechanisms to remove and replace LUWID message affinities aspects of the present invention free up sending queue managers to send more messages, and also improve the scalability of applications. Aspects also teach a method to control numbers of messages arriving on receiver queues accurately as a function of regular interval boundaries.

As discussed generally in the Background section above, new versions of messaging applications deployed on messaging engines of cluster nodes before they are fully tested may lead to production stability concerns. Aspects of the present invention enable enterprise clients to minimize the impact of deploying problematic new versions in messaging cluster production environments, by deploying new versions of a messaging application on limited numbers of nodes and using the proactive batch commit processes described above to limit numbers of messages arriving on a target queue for such nodes on timely basis. This enables service providers to identify and correct problems caused by the deployment of the new versions prior to propagating the new versions to other nodes within the cluster, proportionately reducing impacts on production caused by the identified problems, and then to gradually increase message transmissions using the new versions until full workload capacity may be supported by the new versions.

In a Messaging-as-a-Service environment service providers may charge for services on a per message number basis, wherein each message indicates one transaction request, in contrast to charging on a size of message (for example, bytes) basis. Controlling the number of messages handled by utilizing aspects of the present invention can help in controlling the provision and the quality of such messaging services.

While business messages for a target queue are transferred individually through a defined cluster channel, each transferred message is part of a logical unit of work and needs to be committed, or backed out, as a channel batch. The channel batch methods and processes of the present invention provide efficient solutions for controlling the number of messages arriving on a receiver queue accurately, and on a regular, interval basis.

Clustering environment management may use alternative target queue parameters approaches. For example, "CLWL-WGHT" is a cluster workload weight parameter or attribute that applies a weighting factor to a channel so a ratio (proportion) of messages sent on a channel to a same clustered receiver on a different queue manager queue can be controlled. However, business workloads may vary greatly between different node queue managers, or between peak and off-peak times, making proportionate message control difficult or inconsistent with respect to numbers of messages controlled relative to different nodes or timeframes.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification specify the presence of stated features, integers, steps, operations, elements, and/or components, but do not preclude the presence or addition of one or more other features, integers, steps, operations, elements, components, and/or groups thereof. Certain examples and elements described in the present specification, including in the claims and as illustrated in the figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for a proactive channel agent structure, comprising executing on a computer processor the steps of:

sending individually, to a target queue of a receiving node of a cluster plurality of server nodes, messages of a first batch sequence plurality of messages, each message with a different sequence number indicative of a relative position of the message within the first batch sequence plurality of messages, wherein each of the first batch sequence plurality of messages is associated with a first logic unit of work identifier;

updating a message counter value in response to each receipt by the receiving node of one of the first batch sequence plurality of messages sent to the target queue;

in response to determining that the updated message counter value meets a threshold limit, generating a force commit packet comprising the sequence number of a last one of the first batch sequence plurality of messages sent to the target queue; and in response to determining that the sequence number of the generated force commit packet data is not a last position number within the first batch sequence plurality of messages, associating a second logic unit of work identifier with a subset sequence plurality of the first batch sequence plurality of messages that comprises a plurality of the first batch sequence plurality of messages having different sequence numbers spanning from a first of the sequence numbers to the sequence number of the generated force commit packet data, and committing the subset sequence plurality of the first batch sequence plurality of messages to the target queue of the receiving node, wherein the second logic unit of work identifier is different from the first logic unit of work identifier.

2. The method of claim 1, further comprising:

in response to determining that the sequence number of the generated force commit packet data is not the last position number within the first batch sequence plurality of messages, de-associating all of the first batch sequence plurality of messages from the first logic unit of work identifier, marking all of the first batch sequence plurality of messages as rolled back, and assigning the second logic unit of work identifier to the subset sequence plurality of the first batch sequence plurality of messages marked as rolled back.

3. The method of claim 1, further comprising:

in response to determining that a last of the first batch sequence plurality of messages has been sequentially sent to the receiving node target queue, making a non-blocking receive-from c all;

reading buffered force-commit packet data returned from the non-blocking receive-from call; and determining that the sequence number of the generated force commit packet data is not the last position number within the first batch sequence plurality of messages as a function of reading the sequence number of the read force commit packet data from data returned from the non-blocking receive-from call.

4. The method of claim 1, further comprising:

sending a remainder of the messages of the first batch sequence plurality of messages that each have sequence numbers greater than the sequence number of the generated force commit packet data to an alternative destination that is selected from the group consisting of a pause queue, and a target queue of another node of the cluster of nodes that is indicated as available for receiving messages for the target queue.

5. The method of claim 1, further comprising:

in response to determining that the updated message counter value meets the threshold limit, setting a value of a node control state field for the receiving node within a central controller node to a limit-reached value;

updating other nodes of the cluster inclusive of the sending node with the limit-reached value for the node control state field of the receiving node; and generating the force commit packet in response to updating the sending node with the limit-reached value for the node control state field of the receiving node.

6. The method of claim 5, further comprising:

in response to determining that the message counter did not reach the threshold limit within a specified interval time period from an initialization of the message counter to zero, updating the other nodes of the cluster inclusive of the sending node with an available value for the node control state field of the receiving node.

7. The method of claim 1, further comprising:

integrating computer-readable program code into a computer system comprising a processor, a computer readable memory in circuit communication with the processor, and a computer readable storage medium in circuit communication with the processor; and wherein the processor executes program code instructions stored on the computer-readable storage medium via the computer readable memory and thereby performs the steps of sending the messages of the first batch sequence plurality of messages individually with the different sequence numbers to the target queue of the receiving node, each of the messages associated with the first logic unit of work identifier, updating the message counter value in response to each receipt by the receiving node of one of the first batch sequence plurality of messages sent to the target queue, generating the force commit packet in response to determining that the updated message counter value meets the threshold limit, and in response to determining that the sequence number of the generated force commit packet data is not the last position number within the first batch sequence plurality of messages, associating the second logic unit of work identifier with the subset sequence plurality of the first batch sequence plurality of messages and committing the subset sequence plurality of the first batch sequence plurality of messages to the target queue of the receiving node.

8. The method of claim 7, wherein the computer-readable program code is provided as a service in a cloud environment.

9. A system, comprising:

a processor;

a computer readable memory in circuit communication with the processor; and a computer readable storage medium in circuit communication with the processor;

wherein the processor executes program instructions stored on the computer-readable storage medium via the computer readable memory and thereby:

sends individually, to a target queue of a receiving node of a cluster plurality of server nodes, messages of a first batch sequence plurality of messages, each message with a different sequence number indicative of a relative position of the message within the first batch sequence plurality of messages, wherein each of the first batch sequence plurality of messages is associated with a first logic unit of work identifier;

updates a message counter value in response to each receipt by the receiving node of one of the first batch sequence plurality of messages sent to the target queue;

in response to determining that the updated message counter value meets a threshold limit, generates a force commit packet comprising the sequence number of a last one of the first batch sequence plurality of messages sent to the target queue; and in response to determining that the sequence number of the generated force commit packet data is not a last position number within the first batch sequence plurality of messages, associates a second logic unit of work identifier with a subset sequence plurality of the first batch sequence plurality of messages that comprises a plurality of the first batch sequence plurality of messages having different sequence numbers spanning from a first of the sequence numbers to the sequence number of the generated force commit packet data, and commits the subset sequence plurality of the first batch sequence plurality of messages to the target queue of the receiving node, wherein the second logic unit of work identifier is different from the first logic unit of work identifier.

10. The system of claim 9, wherein the processor executes the program instructions stored on the computer-readable storage medium via the computer readable memory and thereby further:

in response to determining that the sequence number of the generated force commit packet data is not the last position number within the first batch sequence plurality of messages, de-associates all of the first batch sequence plurality of messages from the first logic unit of work identifier, marks all of the first batch sequence plurality of messages as rolled back, and assigns the second logic unit of work identifier to the subset sequence plurality of the first batch sequence plurality of messages marked as rolled back.

11. The system of claim 9, wherein the processor executes the program instructions stored on the computer-readable storage medium via the computer readable memory and thereby further:

in response to determining that a last of the first batch sequence plurality of messages has been sequentially sent to the receiving node target queue, makes a non-blocking receive-from c all;

reads buffered force-commit packet data returned from the non-blocking receive-from call; and determines that the sequence number of the generated force commit packet data is not the last position number within the first batch sequence plurality of messages as a function of reading the sequence number of the read force commit packet data from data returned from the non-blocking receive-from call.

12. The system of claim 9, wherein the processor executes the program instructions stored on the computer-readable storage medium via the computer readable memory and thereby further:

sends a remainder of the messages of the first batch sequence plurality of messages that each have sequence numbers greater than the sequence number of the generated force commit packet data to an alternative destination that is selected from the group consisting of a pause queue, and a target queue of another node of the cluster of nodes that is indicated as available for receiving messages for the target queue.

13. The system of claim 9, wherein the processor executes the program instructions stored on the computer-readable storage medium via the computer readable memory and thereby further:

in response to determining that the updated message counter value meets the threshold limit, sets a value of a node control state field for the receiving node within a central controller node to a limit-reached value;

updates other nodes of the cluster inclusive of the sending node with the limit-reached value for the node control state field of the receiving node; and generates the force commit packet in response to updating the sending node with the limit-reached value for the node control state field of the receiving node.

14. The system of claim 13, wherein the processor executes the program instructions stored on the computer-readable storage medium via the computer readable memory and thereby further:

in response to determining that the message counter did not reach the threshold limit within a specified interval time period from an initialization of the message counter to zero, updates the other nodes of the cluster inclusive of the sending node with an available value for the node control state field of the receiving node.

15. A computer program product for a proactive channel agent structure, the computer program product comprising:

a computer readable storage medium having computer readable program code embodied therewith, wherein the computer readable storage medium is not a transitory signal per se, the computer readable program code comprising instructions for execution by a processor that cause the processor to:

send individually, to a target queue of a receiving node of a cluster plurality of server nodes, messages of a first batch sequence plurality of messages, each message with a different sequence number indicative of a relative position of the message within the first batch sequence plurality of messages, wherein each of the first batch sequence plurality of messages is associated with a first logic unit of work identifier;

update a message counter value in response to each receipt by the receiving node of one of the first batch sequence plurality of messages sent to the target queue;

in response to determining that the updated message counter value meets a threshold limit, generate a force commit packet comprising the sequence number of a last one of the first batch sequence plurality of messages sent to the target queue; and in response to determining that the sequence number of the generated force commit packet data is not a last position number within the first batch sequence plurality of messages, associate a second logic unit of work identifier with a subset sequence plurality of the first batch sequence plurality of messages that comprises a plurality of the first batch sequence plurality of messages having different sequence numbers spanning from a first of the sequence numbers to the sequence number of the generated force commit packet data, and commit the subset sequence plurality of the first batch sequence plurality of messages to the target queue of the receiving node, wherein the second logic unit of work identifier is different from the first logic unit of work identifier.

16. The computer program product of claim 15, wherein the computer readable program code instructions for execution by the processor further cause the processor to:

in response to determining that the sequence number of the generated force commit packet data is not the last position number within the first batch sequence plurality of messages, de-associate all of the first batch sequence plurality of messages from the first logic unit of work identifier, mark all of the first batch sequence plurality of messages as rolled back, and assign the second logic unit of work identifier to the subset sequence plurality of the first batch sequence plurality of messages marked as rolled back.

17. The computer program product of claim 15, wherein the computer readable program code instructions for execution by the processor further cause the processor to:

in response to determining that a last of the first batch sequence plurality of messages has been sequentially sent to the receiving node target queue, make a non-blocking receive-from call;

read buffered force-commit packet data returned from the non-blocking receive-from call; and determine that the sequence number of the generated force commit packet data is not the last position number within the first batch sequence plurality of messages as a function of reading the sequence number of the read force commit packet data from data returned from the non-blocking receive-from call.

18. The computer program product of claim 15, wherein the computer readable program code instructions for execution by the processor further cause the processor to:

send a remainder of the messages of the first batch sequence plurality of messages that each have sequence numbers greater than the sequence number of the generated force commit packet data to an alternative destination that is selected from the group consisting of a pause queue, and a target queue of another node of the cluster of nodes that is indicated as available for receiving messages for the target queue.

19. The computer program product of claim 15, wherein the computer readable program code instructions for execution by the processor further cause the processor to:

in response to determining that the updated message counter value meets the threshold limit, set a value of a node control state field for the receiving node within a central controller node to a limit-reached value;

update other nodes of the cluster inclusive of the sending node with the limit-reached value for the node control state field of the receiving node; and generate the force commit packet in response to updating the sending node with the limit-reached value for the node control state field of the receiving node.

20. The computer program product of claim 19, wherein the computer readable program code instructions for execution by the processor further cause the processor to:

in response to determining that the message counter did not reach the threshold limit within a specified interval time period from an initialization of the message counter to zero, update the other nodes of the cluster inclusive of the sending node with an available value for the node control state field of the receiving node.

* * * * *